US006834991B2

(12) United States Patent
Roeder (10) Patent No.: US 6,834,991 B2
(45) Date of Patent: Dec. 28, 2004

(54) RADIOMETER WITH PROGRAMMABLE NOISE SOURCE CALIBRATION

(75) Inventor: Robert S. Roeder, Dunedin, FL (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/253,207

(22) Filed: Sep. 23, 2002

(65) Prior Publication Data

US 2004/0057496 A1 Mar. 25, 2004

(51) Int. Cl.[7] .......................... G01K 15/00; G01K 7/30; G01J 5/06; G01S 3/02

(52) U.S. Cl. .......................... 374/1; 374/17.5; 374/120; 374/122; 342/351; 342/170; 342/174

(58) Field of Search .................. 374/1–2, 17.5, 374/120, 129, 183, 185; 342/351, 174, 170, 175, 122; 250/338

(56) References Cited

U.S. PATENT DOCUMENTS

| | | | |
|---|---|---|---|
| 3,235,731 A | 2/1966 | Seling ........................ 250/83.3 |
| 3,263,230 A | 7/1966 | Greenberg ................. 343/100 |
| 3,380,055 A | 4/1968 | Fow et al. .................. 343/100 |
| 3,409,827 A | 11/1968 | Goggings, Jr. ............. 324/58.5 |
| 3,525,037 A | 8/1970 | Madden et al. ................ 324/7 |
| 3,564,420 A | 2/1971 | Webb ........................ 325/363 |
| 3,628,151 A | 12/1971 | Roeder ....................... 325/363 |
| 3,631,346 A | * 12/1971 | Riggs ......................... 325/363 |
| 3,638,494 A | 2/1972 | Broussaud et al. ....... 73/355 R |
| 3,693,095 A | 9/1972 | Wilt ........................... 325/363 |
| 3,735,405 A | 5/1973 | Berg .................... 343/100 ME |
| 3,737,905 A | 6/1973 | Haroules et al. ..... 343/100 ME |
| 3,748,904 A | 7/1973 | Ford ............................ 73/359 |
| 3,777,270 A | 12/1973 | Hardy et al. ................ 325/363 |
| 3,902,067 A | * 8/1975 | Anderson ................... 250/338 |
| 4,081,679 A | 3/1978 | Cohn ......................... 250/338 |
| 4,178,100 A | * 12/1979 | Levis ......................... 356/216 |
| 4,235,107 A | * 11/1980 | Ludeke et al. ......... 73/355 EM |

(List continued on next page.)

FOREIGN PATENT DOCUMENTS

WO WO 92/14164 8/1992 ........... G01R/29/08

OTHER PUBLICATIONS

Winson, Peter B., et al, *"A Table–Based Bias and Temperature–Dependent Small–Signal and Noise Equivalent Circuit Model"*, IEEE Transactions on Microwave Theory and Techniques, vol. 45, No. 1, Jan. 1997, pp. 46–51.

Blundell, D. J., *"The United Kingdom National Standard of Microwave Noise at 4.1 GHz and 77K"*, Journal of Physics for Scientific Instruments, vol. 8, 1975, pp. 925–929.

(List continued on next page.)

Primary Examiner—Gail Verbitsky
(74) Attorney, Agent, or Firm—Baker Botts L.L.P.

(57) ABSTRACT

Apparatus and a method for radiometric temperature measurement comprises a radiometer receiver coupled to an antenna/calibration switch that has coupled thereto a brightness temperature signal. A driver coupled to the antenna/calibration switch controls the operation of the switch between an antenna mode and a calibration mode. An adjustable cold/warm noise source is coupled to the antenna/calibration switch to provide a calibration radiation temperature applied through the antenna/calibration switch in the calibration mode to the radiometer receiver. An output of the radiometer receiver is coupled to the adjustable cold/warm noise source and is adjusted in accordance with the output of the radiometer receiver for a null comparison measurement. Also coupled between the output of the radiometer receiver and the antenna/calibration switch is a mode selector switch that operates to a mode one position to couple the output of the radiometer receiver to the adjustable cold/warm noise source. A bias source is also coupled to the mode selector switch and actuation of the mode selector switch into a mode two position couples the bias source to the adjustable cold/warm noise source.

19 Claims, 4 Drawing Sheets

U.S. PATENT DOCUMENTS

| | | | | |
|---|---|---|---|---|
| 4,272,731 A | | 6/1981 | Day et al. | 331/78 |
| 4,507,661 A | * | 3/1985 | Hoover, Jr. et al. | 343/351 |
| 4,521,861 A | * | 6/1985 | Logan et al. | 364/517 |
| 4,527,162 A | | 7/1985 | Strickland | 343/351 |
| 4,568,200 A | | 2/1986 | Hatono et al. | 374/122 |
| 4,677,988 A | | 7/1987 | Constant et al. | 128/736 |
| 5,047,783 A | | 9/1991 | Hugenin | 342/179 |
| 5,128,884 A | | 7/1992 | Prager | 364/571.03 |
| 5,149,198 A | * | 9/1992 | Sterzer | 374/139 |
| 5,160,934 A | * | 11/1992 | Alpers et al. | 342/351 |
| 5,175,555 A | * | 12/1992 | Holak et al. | 342/175 |
| 5,231,404 A | | 7/1993 | Gasiewski | 342/351 |
| 5,270,528 A | | 12/1993 | Ogikubo | 250/201.7 |
| 5,341,814 A | | 8/1994 | Van de Velde et al. | 128/736 |
| 5,354,325 A | | 10/1994 | Chive et al. | 607/101 |
| 5,688,050 A | | 11/1997 | Sterzer et al. | 374/122 |
| 6,137,440 A | | 10/2000 | Roeder et al. | 342/351 |
| 6,217,210 B1 | | 4/2001 | Roeder et al. | 374/1 |
| 6,439,763 B2 | * | 8/2002 | Roeder et al. | 374/1 |

OTHER PUBLICATIONS

Dicke, R. H., *The Measurement of Thermal Radiation at Microwave Frequencies*, The Review of Scientific Instruments, vol. 17, No. 7, Jul. 1946, pp.268–275.

Leber, A., et al, *"Improved Microwave Radiometry for Remote Sensing"*, Conference: Proceedings of the 8th European Microwave Conference, Paris, France, Sep. 4–8, 1978, pp. 25–28.

Frater, Robert H., et al, *"An Active 'Cold' Noise Source"*, IEEE Transactions on Microwave Theory and Techniques, Apr. 1981, pp. 344–347.

Williams, David R., *"Calibration of C–Band 3.7–4.2GHz, Hot–Cold Head S/N101"*, Berkshire Technologies, Inc., May 15, 1998, 7 pgs.

PCT Notification of Transmittal of the International Search Report or the Declaration, mailed May 2, 2004, including International Search Report re PCT/US 03/28339 (7 pgs).

\* cited by examiner-

RADIOMETER WITH PROGRAMMABLE NOISE SOURCE CALIBRATION

GOVERNMENT FUNDING

The U.S. Government may have certain rights in this invention as provided for by the terms of Small Innovative Business Research Contract F19628-00-C-0059 awarded by the U.S. Airforce to Custom Manufacturing & Engineering, Inc.

TECHNICAL FIELD OF THE INVENTION

The present invention relates to a radiometer for measurement of thermal radiation or brightness temperatures, and more particularly to calibration of a radiometer with reference temperatures from an adjustable noise source providing warm radiation temperature signals and cold radiation temperature signals adjustable in accordance with an input to the adjustable noise source.

BACKGROUND OF THE INVENTION

Radiometers are used to measure thermal radiation or brightness temperatures emitted from a segment of a remote object. The segment is commonly referred to as a scene and may be a portion of the earth's surface. Like most sophisticated instrumentation, radiometers require periodic calibration to insure accurate measurements.

Numerous types of microwave/millimeter wave (MMW) radiometers have been proposed over the years. However, most prior art radiometers are subject to internal temperature gradient errors tending to obscure temperature determinations. In addition, electrical noise introduced through the antenna path and within the internal circuitry of the radiometer tends to obscure and adversely affect accurate measurements. Further, amplifier gain instability often causes distortion of the measurement signals. To overcome the latter problem, it has become common to employ a Dicke radiometer circuit wherein the signals from the antenna are sampled and compared with signals from a reference source maintained at a known constant temperature. This overcomes some of the problems of amplifier instability, but in general does not alter effects due to imperfect components and thermal gradients.

While other types of radiometric devices have been used with some success, the Dicke or comparison type of radiometer has been the most widely used for the study of relatively low level noise-like MMW signals, especially where the noise signals to be examined are often small in comparison to the internally generated noise level within the radiometer receiver. While there are several types of comparison radiometers, one popular type of radiometer for use in the microwave/millimeter wave frequency bands is that in which an incoming signal to be measured and a standard or calibrated reference noise signal are compared. This type of radiometer consists essentially of the comparison of the amplitude of an unknown noise signal coming from the source to be examined with a known amplitude of a noise signal from a calibration source. This method has been found useful in measuring with considerable accuracy the effective temperature of an unknown source. In the Dicke or comparison type radiometer, the receiver input is switched between the antenna and a local reference signal noise generator. The detected and amplified receiver output is coupled to a phase-sensing detector operated in synchronism with the input switching. The output signal from such a radiometer receiver is proportionate to the difference between the temperature of the reference signal source and the temperature of the source viewed by the antenna inasmuch as the phase-sensing detector acts to subtract the background or internal noise of the receiver.

MMW radiometers are typically characterized into two common types, total power radiometers and Dicke radiometers. Total power direct detection radiometers are the simplest type and require fewer RF components, but suffer from both short-term and long-term gain variation. Total power receivers require good thermal control of the components to minimize gain variation. A Dicke radiometer employs an RF switch coupled between an antenna and a radiometer receiver thereby allowing the receiver to alternate between the antenna and a known reference load termination. The receiver output is connected to a synchronous detector that produces an output voltage proportional to a difference between the antenna and the reference temperature. Null balance operation for the Dicke radiometer has been achieved by coupling in noise from a hot noise diode to the antenna port of the RF switch thereby enabling matching the temperature from standard reference loads.

Figure 1:
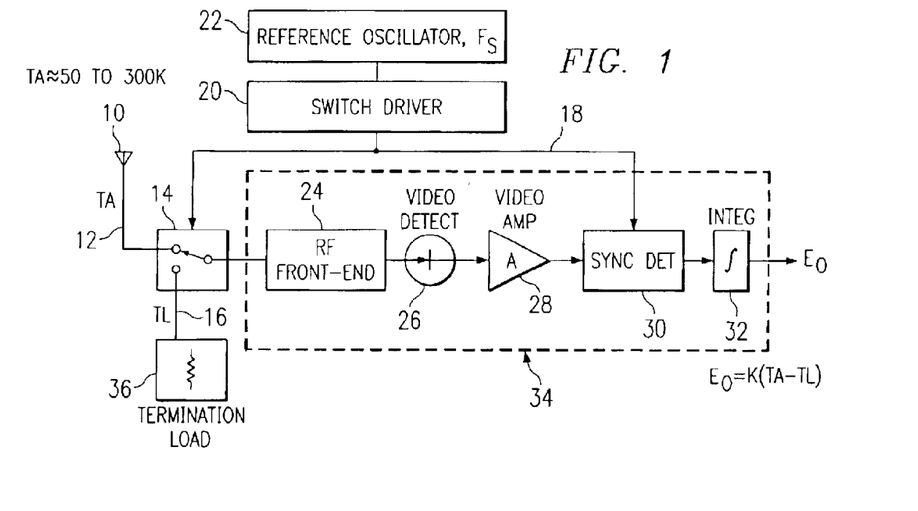
FIG. 1 is a schematic block diagram representation of a prior art conventional Dicke-type radiometer for radiometric temperature measurements.
Figure 2:
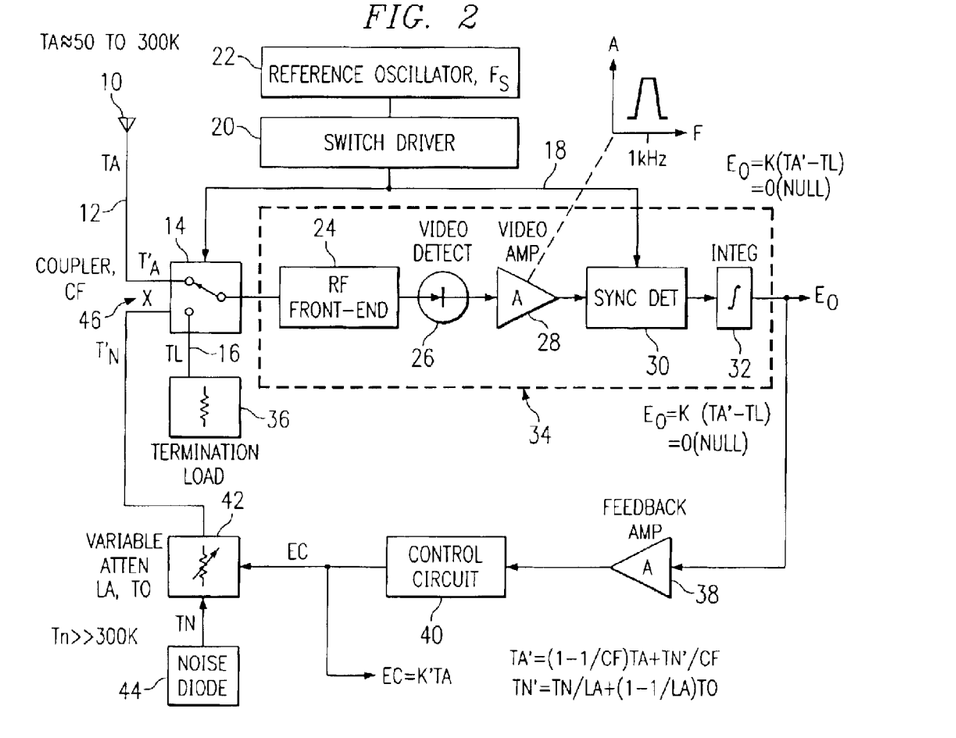
FIG. 2 is a schematic block diagram representation of a prior art conventional Dicke-type radiometer utilizing null balance in a feedback loop.

As described in FIGS. 1 and 2 of U.S. Pat. No. 6,217,210B1, current methods for space measurement of thermal radiation or brightness temperatures rely on the use of external cold sky horns or beams switched to cold outer space in order to obtain a single cold calibration temperature. As described in FIG. 3 of U.S. Pat. No. 6,217,210B1, ground based radiometers most often use internal heated known temperature loads and hot noise source diodes to obtain a single hot calibration temperature.

Thus, there is needed a Dicke-type radiometer that provides improved flexibility and measurement accuracy with less need for thermal control of critical receiver components. Also lacking in the prior art is an automatic null balance radiometer utilizing a programmable cold/warm noise source that can match the range of antenna temperatures that are typically between 50 to 300° K.

SUMMARY OF THE INVENTION

The present invention is an improved radiometer for detecting and measuring MMW signals, including electrical noise signals of the thermal noise level type and comprising a Dicke-type comparison radiometer with an adjustable cold/warm noise source in a feedback loop.

In accordance with the present invention, there is provided a method of radiometric temperature measurement comprising coupling a brightness temperature signal to an antenna/calibration switch. The antenna/calibration switch is actuated into a measurement mode to couple the brightness temperature signal to a radiometer receiver. An output of the radiometer receiver is coupled to an adjustable cold/warm noise source having an output representing calibration temperatures and coupled to the antenna/calibration switch. The cold/warm noise source is adjusted in accordance with the output of the radiometer receiver for a null comparison measurement.

Further in accordance with the present invention, there is provided apparatus for radiometric temperature measurement comprising a radiometer receiver having an input coupled to an antenna/calibration switch. The antenna/calibration switch enables selection between an antenna mode and a calibration mode. A driver coupled to the antenna/calibration switch controls the operation of the switch between the antenna mode and the calibration mode. In the antenna mode a brightness temperature is applied to the input of the radiometer receiver. An adjustable cold/ warm noise source is coupled to the antenna/calibration switch, the noise source provides a calibration radiation temperature applied through the antenna/calibration switch in the calibration mode to the radiometer receiver. Coupled to the output of the radiometer receiver and the input of the adjustable cold/warm noise source is a feedback loop that provides a feedback signal to the noise source to adjust the calibration radiation temperature to match the antenna temperature in accordance with the output of the radiometer receiver.

According to another embodiment of the invention, there is provided a method for dual mode radiometric temperature measurement comprising coupling a brightness temperature signal to an antenna/calibration switch. The antenna/calibration switch is actuated into a measurement mode to couple the brightness temperature signal to a radiometer receiver having an output coupled to a mode selector switch. The mode selector switch is operated into a mode one position to couple the output of the radiometer receiver to an adjustable cold/warm noise source. The antenna/calibration switch is actuated into a calibration mode to decouple the brightness temperature signal from the radiometer receiver and to couple the adjustable cold/warm noise source to the radiometer receiver. A bias source is also coupled to the mode selector switch and actuation of the mode selector switch into a mode two position couples the bias source to the adjustable cold/warm noise source. The bias source is adjusted to vary the output of the adjustable cold/warm noise source applied through the antenna/calibration switch to the radiometer receiver.

In addition, according to the present invention, there is provided apparatus for dual mode radiometric temperature measurement comprising a radiometer receiver coupled to an antenna/calibration switch. The antenna/calibration switch operates between an antenna mode and a calibration mode, in the antenna mode a brightness temperature signal is applied to the radiometer receiver. A driver is coupled to the antenna/calibration switch for controlling the operation of the switch between the antenna mode and the calibration mode. An adjustable cold/warm noise source is also coupled to the antenna/calibration switch, the noise source having an output representing a calibration radiation temperature applied through the antenna/calibration switch in the calibration mode to the radiometer receiver. A mode selector switch for selecting between a null balance mode and a calibration mode is coupled in a feedback loop between the output of the radiometer receiver and the input of the adjustable cold/warm noise source. The mode selector switch operates between a null balance mode and a calibration mode. A bias signal source is coupled to the mode selector switch for applying a bias signal to the adjustable cold/warm noise source through the mode selector switch when in the calibration mode.

A technical advantage of the present invention is a comparison type radiometer having an adjustable cold/warm noise source in a feedback loop for automatic null balance operation. Automatic null balance minimizes or substantially eliminates the effects of receiver gain variation, and bandwidth change with temperature. This reduces the requirement for thermal temperature control of the radiometer to only the adjustable cold/warm noise source thereby reducing power consumption. Another technical advantage of the present invention is a dual mode closed loop and open loop Dicke-type radiometer that when operating in the open loop calibration mode utilizes selected calibration temperatures that cover the range of the antenna temperatures.

BRIEF DESCRIPTION OF THE DRAWINGS

A more complete understanding of the invention may be had by reference to the following detailed description when taken in conjunction with the accompanying drawings.

DETAILED DESCRIPTION OF THE INVENTION

Referring to FIGS. 1 and 2, there is illustrated two traditional systems for measuring the brightness temperature "Ta" emitted from an object and received by an antenna 10. Specifically referring to FIG. 1, the brightness temperature "Ta" is transmitted from the antenna 10 on a scene line 12 to an antenna/calibration switch 14. The antenna/calibration switch 14 connects to either the scene line 12 or a calibration line 16 in accordance with a driver signal on line 18 from a switch driver 20. Controlling the switch driver 20 is a reference oscillator 22 outputting a switching frequency "$f_s$" applied to the switch driver 20.

A signal transmitted through the antenna/calibration switch 14 is applied to a radiometer receiver 34 comprising a conventional RF front end 24 followed by a video detector 26 having an output applied to the input of a video amplifier 28. The output of the video amplifier 28 is applied to a synchronous detector 30 driven in synchronism with the antenna/calibration switch 14 by connection to the output of the switch driver 20. The modulated output of the synchronous detector 30 is applied to an integrator 32 that outputs a brightness temperature signal varying in accordance with the brightness temperature "Ta".

As illustrated, the system of FIG. 1 is a conventional switched or Dicke-type radiometer for measuring brightness temperatures received at the antenna 10. The Dicke-type radiometer was first introduced as a method to eliminate short-term gain variations in a total power radiometer in a time frame of around 1946. The effects of gain variation in any radiometer decreases the radiometer sensitivity or RMS measurement in accordance with the expressions:

$$\Delta T\text{min} = T_s/(BY)^{1/2} \text{ without gain variation} \quad (1)$$

$$\Delta T = T_s(1/BY + (\Delta G/G_s)^2)^{1/2} \text{ with gain variation} \quad (2)$$

Where:

$\Delta T\text{min}$ is the minimum detectable temperature or RMS measurement uncertainty in deg K, Ts is the system noise temperature, Ts=Ta+Tr, where Ta is the antenna temperature, and Tr is the equivalent receiver noise temperature, B is the predetection equivalent noise RF bandwidth, Y is the post detection integration time, Gs is the average power gain, and $\Delta G_s$ is the effective RMS value of the system gain variations.

Receiver gain variations can be long-term (slow) with periods of minutes or longer and are typically compensated by calibrating the radiometer receiver 34 with known input noise temperatures on a frequent basis. Receiver gain variations can also be short-term and the short-term gain variations occur at a faster rate and cannot be compensated with calibration. As shown in Equation 2 above, the results of receiver gain variations can significantly degrade sensitivity due to the $\Delta G_s/G_s$ term in the equation.

The conventional Dicke-type radiometer as shown in FIG. 1 utilizes the antenna/calibration switch 14 at the input to a total power radiometer and also uses the synchronous detector 30 (or a modulator) on the output of the video amplifier 28. Typically, the video detector 28 is a square law detector that converts the input modulated power signal into an output modulated voltage signal that is proportional to the total noise power of the brightness temperature, and also the equivalent system noise temperature, Ts. The RF switching or modulation achieved by the switch 14 is commonly a square wave modulation that connects the brightness temperature sensed by the antenna 10 to the input of the radiometer receiver 34, and alternately connects a termination load 36 that outputs a reference load termination signal T1 on the calibration line 16 to the radiometer receiver. The switching rate, that is the output frequency from the reference oscillator 22, is chosen such that the short-term gain variations do not change appreciably in one switch cycle.

The output voltage, Eo, of the Dicke-type radiometer as illustrated in FIG. 1 utilizing a square wave input modulation through the switch 14 and also utilizing the synchronous detector 30 on the output of the video amplifier is given by the expression:

$$Eo=K(Ta-T1)$$

where:

K is the transfer function of the radiometer,

Ta is the brightness temperature, degrees K, and

T1 is the termination load temperature, degrees K.

The output integrator 32 filters out most of the short-term gain fluctuations including the AC components at the frequency "fs" and higher harmonics thereof. Thus, the Dicke-type radiometer as illustrated in FIG. 1 outputs a signal that is mostly free from the effects of short-term gain variation and will generally provide higher sensitivity than other conventional power radiometers even though it measures the brightness temperature sensed by the antenna 10 only during one half of a time interval.

Referring to FIG. 2, wherein like numerals represent like parts, there is disclosed a conventional null balance Dicke-type radiometer that receives a brightness temperature at the antenna 10. The null balance Dicke-type radiometer as illustrated in FIG. 2 incorporates the same radiometer receiver 34 having an RF front end 24, a video detector 26, a video amplifier 28, and a synchronous detector 30 having an output coupled to an integrator 32. In addition, the null balance Dicke-type radiometer of FIG. 2 comprises a switch driver 20 driven by the output of a reference oscillator 22 at a switching frequency "fs". The output of the switch driver 20 is applied to the synchronous detector 30 and the antenna/calibration switch 14 that is coupled to the scene line 12 and the calibration line 16, where the calibration line 16 is coupled to a termination load 36. The null balance Dicke-type radiometer as illustrated in FIG. 2 was initially introduced by Machin, et al. around 1952.

To balance the radiometer receiver 34 the output of the integrator 32, that is, Eo, is coupled to a feedback amplifier 38 having an output coupled to a control circuit 40 that outputs a control voltage $E_c$ to match the effective antenna brightness temperature to the temperature output from the termination load 36. When utilizing the feedback loop comprising the feedback amplifier 38 and the control circuit 40 the output of the integrator 32, that is the output of the radiometer receiver 34, is given by the expression Eo=K(TÁ-T1)=0, a null condition, and the measured brightness temperature is proportional to the output of the control circuit 40 that results in the null output, Eo, from the integrator 32 and is given by the expression Ec=K'Ta.

To achieve a null balance with the radiometer of FIG. 2 noise is added to the brightness temperature "Ta" by coupling the output of a variable attenuator 42 driven by the output of the control circuit 40. The variable attenuator 42 also receives the output of a noise diode 44. The output of the variable attenuator 42 is applied to the scene line 12 through a coupler 46. To achieve the null balance the added noise coupled to the scene line 12 is adjusted to match the termination load temperature of the termination load 36, T1, which typically represents an ambient temperature of about 300 degrees K.

The null balance Dicke-type radiometer is widely accepted because of the benefits of a null balance system that is largely independent of receiver gain variations and also independent of receiver non-linearity. Both gain variation and receiver non-linearity degrade the sensitivity of a total power system as well as the conventional null balance Dicke-type radiometer as illustrated in FIG. 1. However, the null balance Dicke radiometer relies on accurate calibration of all components in the receiver calibration path; 44, 42 and 46 in order to obtain good performance.

Figure 3:
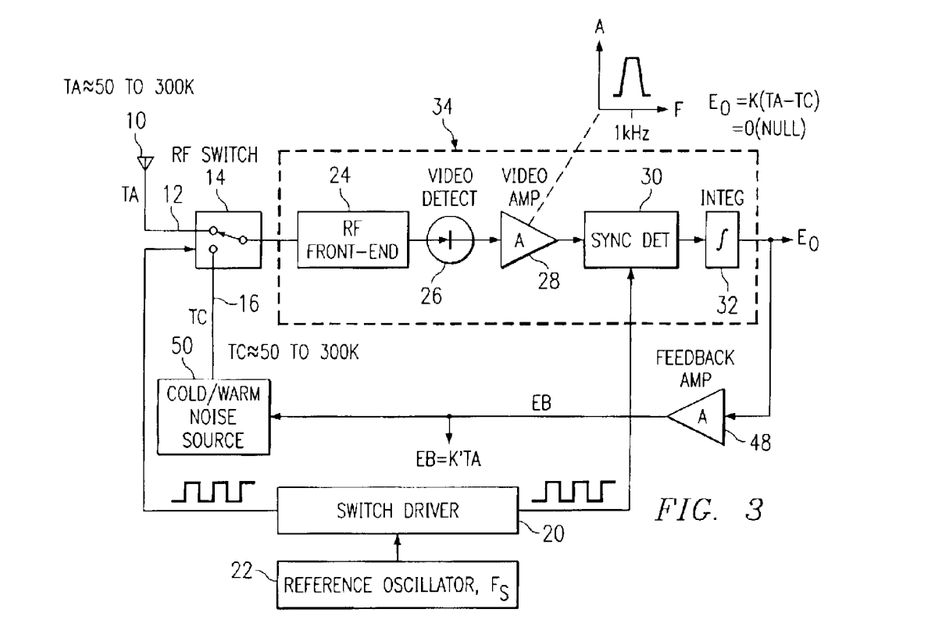
FIG. 3 is a schematic block diagram illustration of a direct detection null balance radiometer for radiometric temperature measurements utilizing an adjustable cold/warm noise source in a feedback loop.

Referring to FIG. 3, there is illustrated one embodiment of apparatus for radiometric temperature measurement in accordance with the present invention utilizing an adjustable cold/warm noise source. Again, like numerals represent like parts throughout the several figures describing radiometers. The advantages of the system of FIG. 3 is that it overcomes deficiencies of total power systems, conventional Dicke-type radiometers, and null balance Dicke-type radiometers. The system of FIG. 3 provides flexibility in making closed loop null balance measurements. A major feature of the system is the use of an adjustable cold/warm noise source in a feedback loop. The adjustable noise source is continuously adjustable to provide an output representing a thermal temperature between 50 degrees K to 300 degrees K, essentially covering the same temperature range as the antenna 10.

Contributing errors identified with the calibration of radiometers for the measurement of brightness temperature arise from the following factors: (1) cold calibration brightness temperature; (2) warm calibration brightness temperature; (3) the radiometer receiver transfer function; (4) the ground retrieval algorithm (for spaceborne systems); and (5) antenna brightness temperature. Each of these contributing errors must be separately addressed and combined in establishing an overall accuracy scheme for a radiometer such as illustrated in FIG. 3. The errors associated with the cold and warm calibration brightness temperatures and the radiometer receiver transfer function are addressed by the embodiment of the invention illustrated in FIG. 3.

Referring to FIG. 3, there is illustrated a block diagram of a system for measuring radiometric temperatures including an antenna 10, coupled to an antenna/calibration switch 14 by means of a scene line 12. An output port of the switch 14 couples to a radiometer receiver 34 comprising a RF front end 24, a video detector 26, a video amplifier 28 (tuned at about 1 kHz) and having an output applied to a synchronous detector 30. An output of the synchronous detector 30 is coupled to an integrator 32.

The modulated brightness temperature signal at the output port of the switch 14 is applied to the input of the radiometer receiver 34 and the output of the receiver 34 is given by the expression Eo=K(Ta−Tc)=0, that is a null balance.

The feedback path for the system of FIG. 3 comprises a feedback amplifier 48 with a bias control voltage output applied to an adjustable cold/warm noise source 50. The output of the cold/warm noise source 50 is applied through the calibration line 16 to the antenna/calibration switch 14.

An advantage of the embodiment of the invention illustrated in FIG. 3 is the balancing of the antenna temperature with matching cold/warm source temperature representations without the need for coupling a hot noise temperature to the scene line 12 as illustrated in FIG. 2. Further advantages of the embodiment of FIG. 3 are: (1) higher measurement sensitivity without coupling loss in the scene line 12; (2) higher sensitivity without requiring injecting a hot noise temperature that increases the system noise temperature; and (3) fewer components resulting in a lower cost system. The benefits of null balance operation are achieved largely independent of receiver gain variation and receiver gain non-linearity.

The system of FIG. 3 also comprises the reference oscillator 22 outputting a switch frequency "fs" applied to a switch driver 20 for synchronizing the operation of the switch 14 with the synchronous detector 30 as previously described.

Again, the measured brightness temperature sensed by the antenna 10 is proportional to the bias control voltage Eb output from the feedback amplifier 48. The bias control voltage output from the feedback amplifier 48 is given by the expression: Eb=K'Ta. This voltage is varied to produce a null output from the integrator 32 as previously described.

Figure 4:
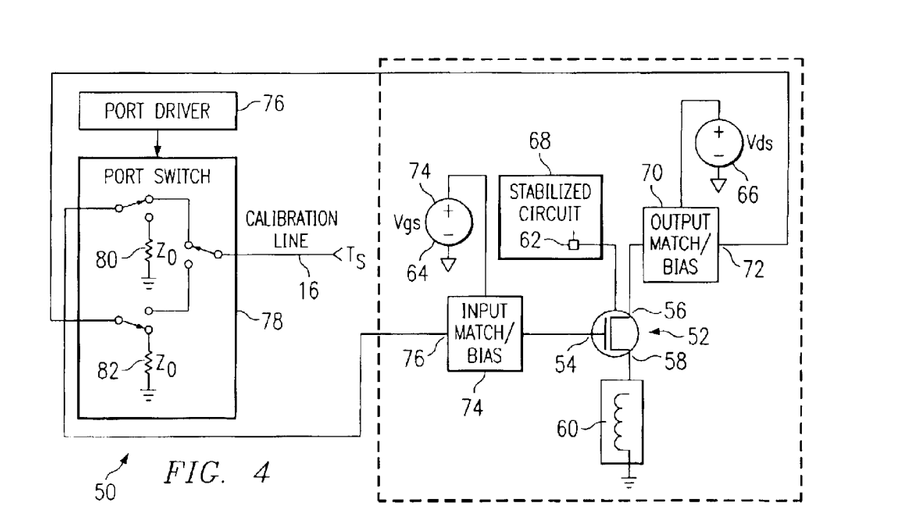
FIG. 4 is a schematic of the adjustable cold/warm noise source as illustrated in the radiometer of FIG. 3.

Referring to FIG. 4, there is illustrated a schematic of the adjustable cold/warm noise source 50. This noise source is described and claimed in U.S. Pat. No. 6,217,210 B1.

Referring FIG. 4, there is illustrated a schematic of the adjustable cold/warm noise source 50. The noise source 50 includes a field effect transistor (FET) configured as a noise equivalent model 52 and having a gate port 54, a drain port 56 and a source port 58. The noise equivalent model 52 is a microwave active circuit designed to generate noise temperatures such as warm and cold thermal radiation temperatures "Tw" and "Tc" when DC bias is applied.

The term "noise temperature" is an expression for the noise power spectral density at a specified f frequency and is derived from Planck's blackbody formula. The average energy of an oscillator at a temperature T is:

$$\langle \in \rangle = \frac{hf}{\exp(hf/kT) - 1}$$

where f is the frequency; h is Planck's constant; and k is the thermal conductivity. At high temperatures and low frequencies $\langle \in \rangle$ approaches kT so the power in a bandwidth B will be P=kTB (Nyquist's formula). A quantity φ=P/kB is taken as a convenient unit of thermal noise power spectral density and is referred to as "noise temperature."

The noise source 50 includes a source inductance 60 with one end coupled to the source port 58 of the noise equivalent model 52 and another end connected to ground. The source inductance 60 provides series feedback for the noise source 50, where the source inductance 60 is typically in the range of 20–700 pH.

A bias circuit 74 generates the DC bias that is applied to the noise source 50, during the calibration mode. The bias circuit 74 generates the voltage "Vgs" 64 (voltage across the gate port 54 and the source port 58) and the voltage "Vds" 66 (voltage across the drain port 56 and the source port 58). The switch driver/amplifier 86 controls the magnitude of the DC bias to change the values of the cold and hot thermal radiation temperatures "Tc" and "Tw".

A stabilizing compensation circuit 68 in contact with the noise equivalent model 52 provides further control of the DC bias. The stabilizing circuit 68 includes a precision thermistor 62 and measures the physical temperature "Td" of the noise source 50. When the stabilizing compensation circuit 68 is not used fluctuations in the physical temperature "Td" of the noise source 50 may adversely affect the performance of the noise source.

An output matching impedance network 70 includes an output port 72 from which the warm thermal radiation temperature "Tw" is output. The output matching impedance network 70 further includes a plurality of output transmission lines and/or lumped elements configured and sized to match the impedances of the output port 72 and the drain port 56 of the noise equivalent circuit 52. The output matching network 70 has one end connected to the drain port 56.

An input matching impedance network 74 includes an input port 76 from which the cold thermal radiation temperature "Tc" is output. The input matching network 74 further includes a plurality of input transmission lines and/or lumped elements configured and sized to match the impedances of the input port 76 and the gate port 54 of the noise equivalent circuit 52. The input matching impedance network 74 has one end connected to the gate port 54 of the noise equivalent model 52.

A port driver 76 actuates and controls a port switch 78 according to a port switch command. The port driver 76 preferably is configured with low loss RF ferrite switches. The port switch 78 has a plurality of contracts connecting output port 72 and input port 76, to the calibration line 16.

The port switch 78 selects either the cold thermal radiation temperature "Tc" or the hot thermal radiation temperature "Tw." The contacts of the port switch 78 are configured in a predetermined manner such that a matched load 80 terminates the input port 76 when the calibration line 16 connects to the output port 72, or a matched load 82 terminates the output port 72 when the calibration line 16 connects to the input port 76.

The hot thermal radiation temperature "Tw" exists at the output port 72 when the matched load 80 terminates the input port 76, and a cold thermal radiation temperature "Tc" exists at the input port 76 when the matched load 82 terminates the output port 72. The two matched loads 80 and 82 have one end connected to the ground and the other end connected to either the output port 72 or the input port 76.

Figure 5:
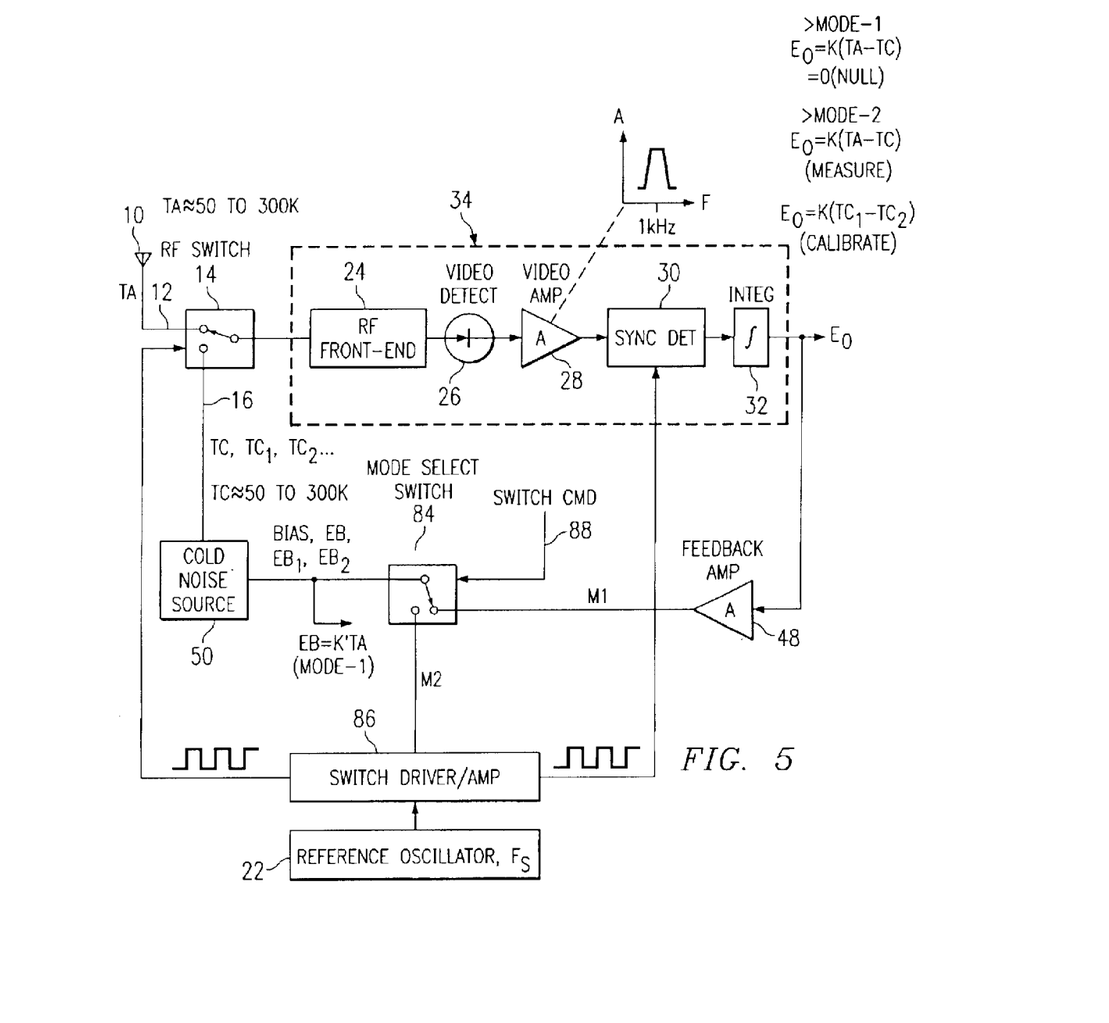
FIG. 5 is a schematic block diagram illustration of a dual mode Dicke-type radiometer for radiometric temperature measurement utilizing direct detection null balance in mode one and in mode two detection plus switch calibration utilizing an adjustable cold/warm noise source.

Referring to FIG. 5, there is shown an alternate embodiment of the present invention comprising a dual mode Dicke-type radiometer with adjustable cold/warm noise source calibration. Again, like numerals represent like parts throughout the several views in this application. Those components of the system of FIG. 5 previously discussed will not be further described at this time.

A brightness temperature input to the antenna 10 is processed by the radiometer receiver 34 through action of the antenna/calibration switch 14. An output of the integrator 32 is coupled to the input of a feedback amplifier 48 having an output coupled to a mode selector switch 84. The mode selector switch 84 is switched between mode 1 (M1) and mode 2 (M2) in response to a signal on a switch line 88. In mode M1 the output of the feedback amplifier 48 is coupled through the mode selector switch 84 to the adjustable cold/warm noise source 50 as described with reference to FIG. 3. In mode M1 the antenna brightness temperature received by the antenna 10 is matched with the output of the cold/warm noise source 50 without the requirement of coupling a hot noise temperature to the antenna port as described with reference to FIG. 2. In mode M1 (null balance) when the brightness temperature at the output of the cold/warm noise source 50 result in a balanced condition, then the output of the feedback amplifier 48 represents a measure of the brightness temperature as given by the expression: Eb=K'Ta.

In mode M2 the dual mode Dicke-type radiometer of FIG. 5 operates as an open loop measurement system and an open loop periodic calibration system. The mode selector switch 84 is actuated to connect the switch driver/amplifier 86 to the cold/warm noise source 50. The switch driver/amplifier 86 is coupled to a reference oscillator 22 that provide a switching frequency fs to the driver/amplifier 86.

During the open loop measurement operation of FIG. 5 a bias voltage from the switch driver/amplifier 86 is applied through the mode selector switch 84 to the cold/warm noise source 50. The bias voltage sets the calibration temperature on the calibration line 16 to Tc, Tc1, and Tc2 in addition to other calibration temperatures. The antenna/calibration switch 14 in response to the switching frequency fs from the switch driver/amplifier 86 alternates between the brightness temperature from the antenna 10 and the selected calibration temperature on the calibration line 16. The switching frequency fs is set to be approximately 1 kHz, that is, above the spectrum of the receiver short-term gain variations.

The modulated signal from the antenna/calibration switch 14 is coupled to the RF front end 24 followed by the video detector 26 and the tuned video amplifier 28 operating at a center frequency of 1 kHz. The output of the video amplifier 28 is applied to the synchronous detector 30 and then to the output integrator 32 as previously explained. The advantages of the open loop Dicke-type measurement mode M2 are: (1) a direct Dicke measurement is provided with selectable known reference temperatures adding flexibility for space and ground base measurements; and (2) periodic cold/warm noise source calibration covering the full dynamic range of the radiometer receiver 34.

Figure 6:
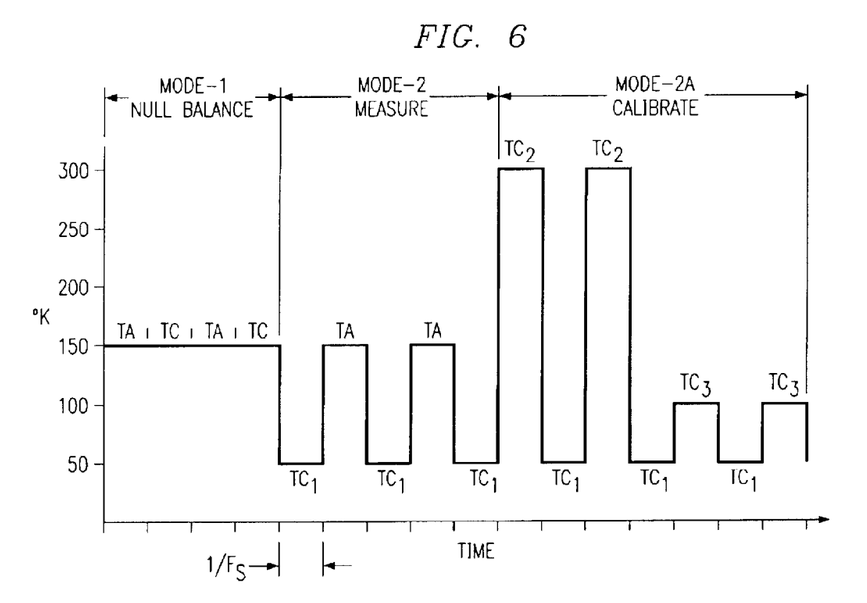
FIG. 6 is an example illustrating the noise temperatures applied to the input of the radiometer receiver of FIG. 5 for the two modes of operation.

Referring to FIG. 6, there is shown an example of noise temperature signal applied to the input of the radiometer receiver 34 from the antenna/calibration switch 14. It should be noted that FIG. 6 is an example as an aid in explaining the modes of operation of the radiometer of the present invention. In the null balance operation of the system of FIG. 3 and the mode M1 operation of the system of FIG. 5, if the brightness temperature Ta received at the antenna 10 is observed to be 150° K., then the null balance reference port temperature representation Tc on the calibration line 16 would also be 150° K. on a cycle-by-cycle basis of the switching frequency fs as illustrated by the example in FIG. 6 under the heading "Mode-1". The "Mode-1" heading in FIG. 6 represents operation of the radiometer of FIG. 3 in accordance with one embodiment of the present invention and represents the mode M1 operation of the system of FIG. 5, a second embodiment of the invention.

Referring specifically to FIG. 5, during the measurement cycle of the mode M2 operation, the modulated input temperature coupled to the radiometer receiver 34 is shown in FIG. 6 to alternate between the antenna temperature Ta and the calibration temperature Tc1. The reference or calibration temperature Tc is determined by a bias voltage applied to the adjustable cold/warm noise source 50 through the mode selector switch 84. This mode of operation for the system of FIG. 5 is illustrated in FIG. 6 under the heading "Mode-2 Measure". During the mode-2 operation of the system of FIG. 5 in the calibration cycle the antenna/calibration switch 14 is commanded to couple to the calibration line 16. During the calibration cycle the cold/warm noise source 50 is stepped between alternating calibration temperatures, for example, Tc2–Tc1, Tc3–Tc1. This is illustrated in FIG. 6 under the heading "Mode-2*a* Calibrate". In the "Mode-2*a* Calibrate" cycle the radiometer of FIG. 5 is calibrated over the full dynamic range of the radiometer receiver 34.

Although the present invention has been described in detail, various changes and modifications may be suggested to one skilled in the art. It is intended that the present invention encompass such changes and modifications as fall within the scope of the appended claims.

What is claimed is:

1. A method of radiometric temperature measurement, comprising:
    coupling a brightness temperature signal to an antenna/calibration switch;
    actuating the antenna/calibration switch into a measurement mode to couple the brightness temperature signal to a radiometer receiver;
    coupling an output of the radiometer receiver to an adjustable cold/warm noise source;
    coupling the adjustable cold/warm noise source to the antenna/calibration switch; and
    adjusting the cold/warm noise source in accordance with the output of the radiometer receiver; and
    wherein adjusting the cold/warm noise source comprises adjusting the cold/warm noise source to a comparison null between the brightness temperature signal and the output of the cold/warm noise source.

2. The method of radiometric temperature measurement as in claim 1 further comprising actuating the antenna/calibration switch into a calibration mode to couple the cold/warm noise source to the radiometer receiver.

3. The method of radiometric temperature measurement as in claim 1 wherein actuating the antenna/calibration switch comprises modulating the brightness temperature signal with an output of the cold/warm noise source.

4. The method of radiometric temperature measurement as in claim 1 further comprising demodulating the brightness temperature signal in accordance with operation of the radiometer receiver.

5. The method of radiometric temperature measurement as in claim 1 wherein actuating the antenna/calibration switch comprises modulating the brightness temperature signal with an output of the cold/warm noise source; and
    further comprising demodulating the brightness temperature signal in accordance with the operation in the radiometer receiver; and
    synchronizing the modulation of the brightness temperature signal with the demodulation of the brightness temperature signal.

6. Apparatus for radiometric temperature measurement, comprising:
    a radiometer receiver;
    an antenna/calibration switch coupled to the radiometer receiver for selecting between an antenna mode and a calibration mode, the antenna mode enabling a brightness temperature to be applied to the receiver;

a driver coupled to the antenna/calibration switch for controlling the operation of the switch between the antenna mode and the calibration mode;

an adjustable cold/warm noise source coupled to the antenna/calibration switch, the cold/warm noise source supplying a calibration radiation temperature applied through the antenna/calibration switch in the calibration mode to the radiometer receiver;

a feedback loop coupled to the output of the radiometer receiver and the adjustable cold/warm noise source to adjust the calibration radiation temperature in accordance with the output of the radiometer receiver; and a feedback amplifier having an input coupled to the output of the radiometer receiver and having an output coupled to the adjustable cold/warm noise source and representing the brightness temperature.

7. The apparatus as in claim 6 wherein the radiometer receiver comprises a detector coupled to the driver for operation of the radiometer receiver in synchronism with the antenna/calibration switch.

8. The apparatus as in claim 7 wherein the radiometer receiver comprises an integrator having an output coupled to the input of the feedback amplifier.

9. A method for dual mode radiometric temperature measurement, comprising:

coupling a brightness temperature signal to an antenna/calibration switch;

actuating the antenna/calibration switch into a measurement mode to couple the brightness temperature signal to a radiometer receiver;

coupling an output of the radiometer receiver to a mode selector switch;

actuating the mode selector switch into a mode one position to couple the output of the radiometer receiver to an adjustable cold/warm noise source;

actuating the antenna/calibration switch into a calibration mode to decouple the brightness temperature signal from the radiometer receiver and couple the adjustable cold/warm noise source to the radiometer receiver;

coupling a bias source to the mode selector switch;

actuating the mode selector switch into a mode two position to couple the bias source to the adjustable cold/warm noise source and decouple the output of the radiometer receiver from the cold/warm noise source; and wherein actuating the antenna/calibration switch comprises modulating the brightness temperature signal with the output of the adjustable cold/warm noise source.

10. The method for dual mode radiometric temperature measurement as in claim 9 further comprising adjusting the bias source to vary the cold/warm noise temperature representation output from the adjustable cold/warm noise source when actuating the mode selector switch into the mode two position.

11. The method for dual mode radiometric temperature measurement as in claim 10 wherein adjusting the bias source comprises adjusting the bias source to output a temperature representation from the adjustable cold/warm noise source ranging from 50 K to 300 K.

12. The method for dual mode radiometric temperature measurement as in claim 9 further comprising synchronizing the actuation of the antenna/calibration switch with operation of the radiometer receiver.

13. The method for dual mode radiometric temperature measurement as in claim 9 further comprising demodulating the brightness temperature signal in accordance with operation of the radiometer receiver.

14. The method for dual mode radiometric temperature measurement as in claim 9 wherein actuating the antenna/calibration switch comprises modulating the brightness temperature signal with the output of the adjustable cold/warm noise source; and further comprising demodulating the brightness temperature signal in accordance with operation of the radiometer receiver; and synchronizing the modulation of the brightness temperature signal with the demodulation of the brightness temperature signal and the radiometer receiver.

15. Apparatus for dual mode radiometric temperature measurement, comprising:

a radiometer receiver;

an antenna/calibration switch coupled to the receiver for selecting between an antenna mode and a calibration mode, the antenna mode coupling a brightness temperature to the radiometer receiver;

an adjustable cold/warm noise source coupled to the antenna/calibration switch, the adjustable cold/warm noise source supplying a calibration radiation temperature applied through the antenna/calibration switch in a calibration mode to the radiometer receiver;

a mode selector switch for selecting between a null balance mode and a calibration mode, the null balance mode coupling an output from the radiometer receiver to the adjustable cold/warm noise source;

a bias signal source coupled to the mode selector switch for applying a bias signal to the adjustable cold/warm noise source through the mode selector switch in the calibration mode; and a driver coupled to the antenna/calibration switch for controlling the operation of the switch between the antenna mode and the calibration mode.

16. The apparatus for dual mode radiometric temperature measurement as in claim 15 further comprising a feedback loop coupled to the output of the radiometer receiver and the adjustable cold/warm noise source through the mode selector switch in the null balance mode.

17. The apparatus for dual mode radiometric temperature measurement as in claim 16 wherein the feedback loop comprises a feedback amplifier having an input coupled to an output of the radiometer receiver and an output coupled through the mode selector switch when in null balance mode to the adjustable cold/warm noise source, the output of the feedback amplifier comprising a measurement of the brightness temperature signal.

18. The apparatus for dual mode radiometric temperature measurement as in claim 15 wherein the radiometer receiver comprises a detector coupled to the driver for operation in synchronism with the antenna/calibration switch.

19. The apparatus for dual mode radiometric temperature measurement as in claim 15 wherein the bias signal source outputs selected bias signals applied to the adjustable cold/warm noise source through the mode selector switch when in the calibration mode to output from the cold/warm noise source calibration temperature signals in a range from 50 K to 300 K.

* * * * *